March 7, 1933.  H. R. GOTTHARDT ET AL  1,900,603
AUTOMATIC CONVEYING APPARATUS
Filed March 12, 1932  6 Sheets-Sheet 1

Inventor
HENRY R. GOTTHARDT
WILLIAM E. CAIN

March 7, 1933.  H. R. GOTTHARDT ET AL  1,900,603
AUTOMATIC CONVEYING APPARATUS
Filed March 12, 1932  6 Sheets-Sheet 2

Fig. 4.

Inventor
HENRY R. GOTTHARDT
WILLIAM E. CAIN
C. L. Parker Jr.
Attorney

March 7, 1933.  H. R. GOTTHARDT ET AL  1,900,603
AUTOMATIC CONVEYING APPARATUS
Filed March 12, 1932   6 Sheets-Sheet 5

Inventor
HENRY R. GOTTHARDT
WILLIAM E. CAIN
C. L. Parker Jr.
Attorney

Patented Mar. 7, 1933

1,900,603

UNITED STATES PATENT OFFICE

HENRY R. GOTTHARDT, OF LOUISVILLE, KENTUCKY, AND WILLIAM E. CAIN, OF JEFFER-
SONVILLE, INDIANA, ASSIGNORS TO LOGAN CO. INC., OF LOUISVILLE, KENTUCKY, A
CORPORATION OF KENTUCKY

AUTOMATIC CONVEYING APPARATUS

Application filed March 12, 1932. Serial No. 598,486.

This invention relates to automatic conveying apparatus and more particularly to automatic vertical elevators.

In our prior Patent No. 1,808,135, for "automatic vertical elevator", granted June 2nd, 1931, we have described and claimed an apparatus operative for transferring articles or packages between different floors of a building. In other words, the structure of our prior patent is operative for transferring an article or package from a lower floor of a building to an upper floor, or from one of the upper floors to a lower floor, and the apparatus provides means adapted to be automatically set to predetermine the destination of an article or package to automatically effect its discharge at such destination.

More specifically, the structure of the prior patent referred to includes elevating means in the form of endless chains having upwardly moving runs and downwardly moving runs, and loading and discharge stations are associated respectively with the upwardly and downwardly moving runs of the elevator chains.

Means are provided for effecting the automatic loading of an article or package at a given floor of a building. The elevator chains are provided with carriers which move vertically with the chains, and upon the approach of one of the upwardly moving carriers to a loading station on which there is an article or package to be picked up, a gate is automatically lowered into loading position, and the article or package moves to a position on the gate ready to be picked up by the carrier in its upward movement past the loading station.

In such prior construction it merely is necessary for an operator to place the article or package in position at the loading station and to key it for its proper destination. If the approaching upwardly moving carrier is empty, the package or article will be automatically placed in loading position with respect to the carrier, while if the approaching carrier is already loaded, the package which it is desired to transfer to another floor will be prevented from moving to operative position with respect to the carrier, and will remain at the loading station until an empty carrier approaches. The destination of the article is determined by employing article holders in the form of boxes having openings for the reception of keys in selected positions and the presence of a key in a selected opening causes a circuit to be closed at the selected discharge station to effect movement of an unloading gate into the path of travel of the loaded carrier whereby the box or article holder on such carrier will be deposited upon the unloading gate. The system referred to also includes a number of other features. For example, after a loading gate has been moved to operative position and an article thereon has been picked up by an empty carrier, the continued upward movement of the carrier moves the gate back to normal position where it remains until it is desired to transfer another box or package. Similarly, a selected discharge gate will be moved to operative position to receive a box from a downwardly moving carrier and after the article is moved from the unloading gate the latter will be automatically moved to inoperative position pending the arrival of another article holder at such discharge station.

An important object of the present invention is to provide an improved automatic conveying apparatus of the same general character as the apparatus disclosed in our prior patent referred to, but wherein the necessity for employing uniform boxes or article holders having key means associated therewith for determining their destination is eliminated.

A further object is to provide means adjacent each loading station and wholly independent of the articles or packages to be conveyed for determining the destination of such articles or packages.

A further object is to provide dial means adjacent each loading station adapted to be set in selected position to determine the destination of articles or packages of different kinds.

A further object is to provide automatic means operative after an article has been picked up at a loading station for clearing the dial setting.

A further object is to provide a plurality of loading stations each in the form of a platform having live roller conveyors associated therewith and gates adapted to be moved to a substantially horizontal operative position to permit articles to be picked up therefrom by the conveyor carriers, and to provide means automatically operative as the gates of a given loading station are lowered to operative position for operating the live rollers of the loading platform to effect movement of the article to loading position on the gates.

A further object is to provide a plurality of unloading stations each including gates movable to substantially horizontal position to receive an article or package from a conveyor carrier and wherein the unloading gates are provided with live rollers, and to provide means automatically operative when the gates are moved to operative position for effecting operation of the live rollers to transfer an article or package from the gates to permit the latter to be moved to inoperative position.

A further object is to provide means carried by each carrier for determining the unloading gates of which unloading station shall be moved to operative position to receive an article on the carrier, and wherein such means includes a plurality of members one of which is selected for operation in accordance with the dial setting at the station at which the article is placed on the conveyor carrier.

A further object is to provide a conveyor carrier having a plurality of unloading station selecting fingers normally arranged in inoperative position and adapted to be selectively moved to operative position in accordance with the dial setting of the loading station, the setting of the dial being operative for arranging a selected arm in the path of travel of one of the fingers of the carrier to move the latter to operative position.

A further object is to provide an apparatus of the character referred to wherein power driven means is employed for effecting movement of a package into position to be picked up by a carrier, and wherein such power means is rendered automatically operative upon the movement of the gates of the loading station to operative position.

Other objects and advantages of the invention will become apparent during the course of the following description.

In the drawings we have shown one embodiment of the invention. In this showing.

Figure 1:
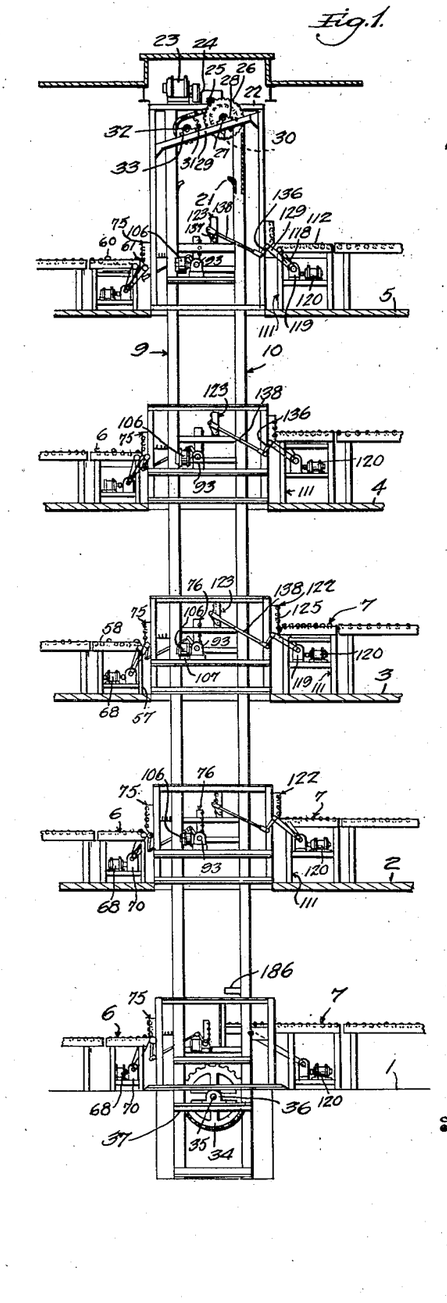
Figure 1 is a vertical sectional view through a building showing the apparatus installed.

Referring to Figure 1, it will be noted that the apparatus is shown installed in a five story building, the successive floors of which are indicated by the numerals 1 to 5 inclusive. It will be apparent that the apparatus is not limited to installation in a building of any particular number of floors, nor is the invention limited to its application to a conveyor of the vertical elevator type. Each floor of the building is provided with a loading station 6 and an unloading station 7, and since the loading and unloading stations for the different floors are identical, only one station of each character need be described in detail.

Figures 5, 6, 7:
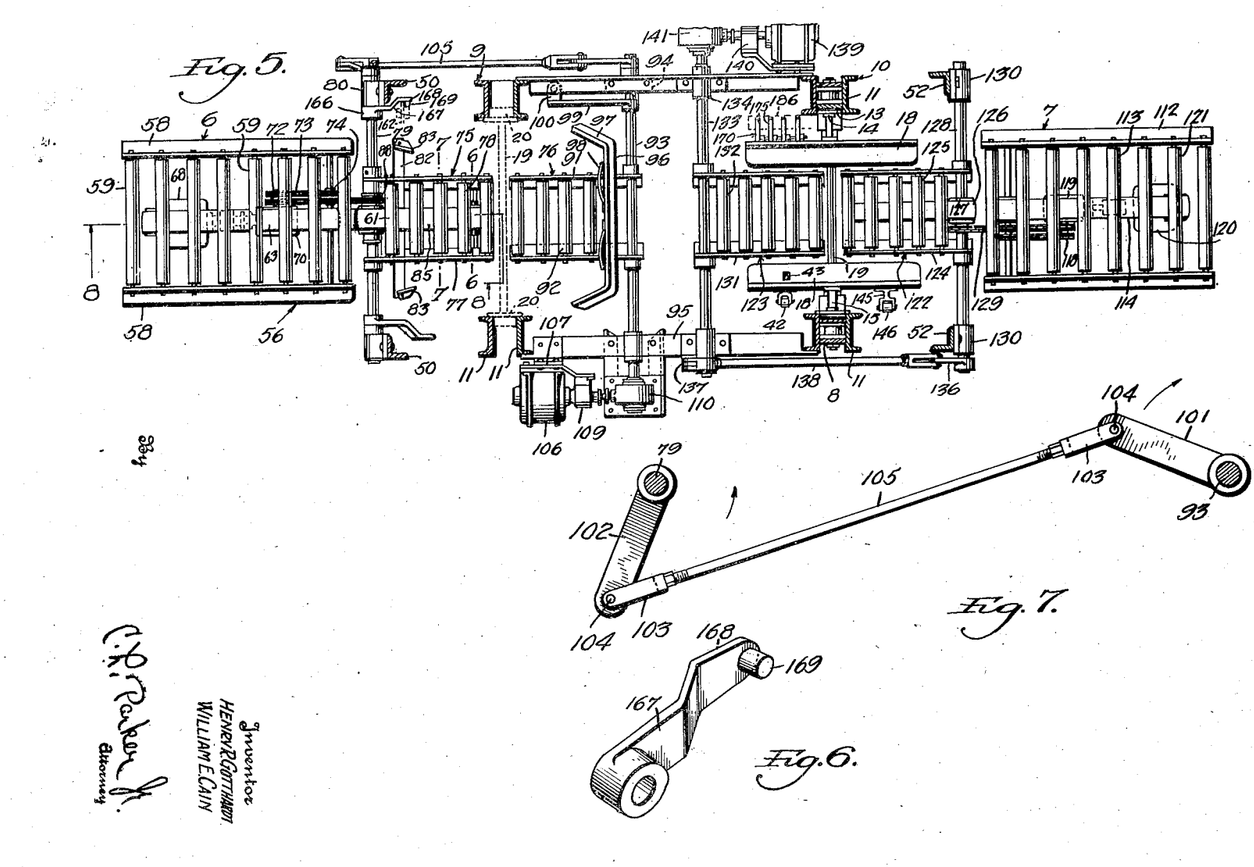
Figure 5 is a plan view of the same, parts being shown in section.
Figure 6 is a detail perspective view of an operating arm.
Figure 7 is a detail sectional view through a pair of loading or unloading station gate supporting shafts showing the connecting means therebetween.

In the present embodiment of the invention, the conveying apparatus per se comprises opposite pairs of chains 8 which operate in a pair of parallel guides 9 on the ascending side of the apparatus and in a similar pair of guides 10 on the descending side. Referring to Figure 5, it will be noted that each of the vertical guides 9 and 10 preferably includes spaced channel beams 11 having their base portions facing toward and parallel to each other, but it will be apparent that any suitable form of guides may be employed. At spaced intervals, the conveyor chains 8 are provided with article or package carriers indicated as a whole by the numeral 12.

Figure 2:
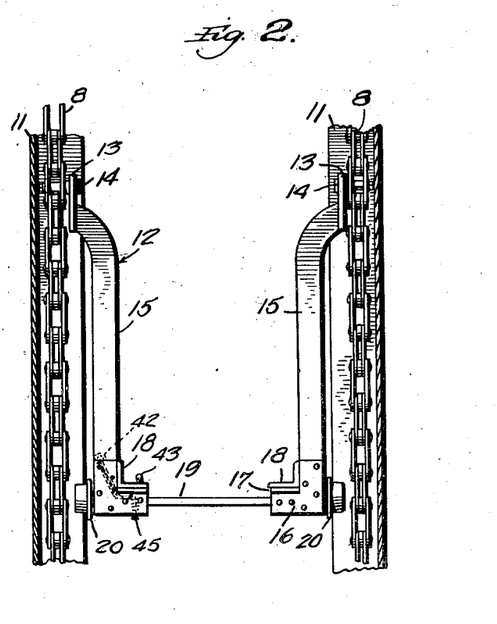
Figure 2 is a fragmentary vertical sectional view through a pair of the elevator guide rails showing a carrier and portions of the chains in position with respect thereto.

Referring to Figures 2 and 5, it will be noted that each carrier includes a small side plate 13 pivotally connected to each chain as at 14, and a depending arm 15 is carried by each plate 13 the main body portions of the arm 15 being arranged inwardly of the guide rails. The arms 15 are provided on opposite sides of their lower ends with substantially L-shaped plates 16 each of which carries a laterally extending flange 17, and these flanges support angle iron rails 18. These rails serve to support the articles or packages being conveyed in a manner to be described. A rod 19 extends between the plates 16 at each side of each carrier, and each rod is provided at its outer end with wheels or rollers 20 traveling within the guides 9 and 10, depending upon whether the carrier is ascending or descending. The inner portions of the guides 9 and 10, that is the rails 11 of the ascending and descending guides which face toward each other, are cut away and turned inwardly at a point spaced from their upper ends as at 21 to permit each carrier to swing across from the ascending guides to the descending guides when the carrier reaches the top of the building.

Any suitable means may be provided for driving the elevating or conveying chains. Referring to Figure 1, the numeral 22 designates a platform adjacent the roof of the building and a motor 23 is arranged on this platform. The motor operates through a suitable reduction gearing 24 to drive pinions 25 meshing with gears 26 at opposite sides of the elevator. These gears are respectively supported by shafts 27 mounted in bearings 28 supported upon rails 29. A sprocket 30 is carried by each shaft 27 and the chains 8 pass around these sprockets and around an additional pair of sprockets 31 carried by shafts 32. These shafts are supported in bearings 33 mounted upon the rails 29. The sprockets 30 and 31 are arranged in the vertical planes of the two chains 8 and each is mounted on a separate shaft at each side of the apparatus in order that the space between the chains may be clear to provide for the swinging of the arms 15 of each carrier as the latter passes over from the ascending to the descending side of the apparatus.

Adjacent the first floor of the building the chains pass around a pair of relatively large sprockets 34 each of which is mounted upon a shaft 35. Each shaft 35 is journalled in a bearing 36 mounted upon a supporting rail 37. One of the sprockets 34 is mounted in the plane of each chain 8 and the shafts for the sprockets do not extend inwardly there-beyond in order that the space between the sprockets may be left clear for movement of the carriers between the sprockets.

Figure 3:
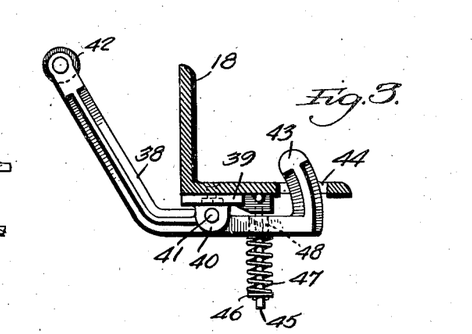
Figure 3 is a detail section through a portion of one carrier showing an automatic trip arm associated therewith.

For a purpose to be described, each carrier is provided with a lever arm 38 as shown in detail in Figure 3. One of the side rails 18 of each carrier is provided with a bracket 39 carrying a depending bearing 40 through which passes a shaft 41 pivotally supporting the arm 38. The outer end of the arm extends upwardly at an angle and is provided at its free end with a roller 42. The inner end of the arm 38 is provided with an upwardly extending finger 43 arranged in an opening 44 in the associated rail 18. The bracket 39 supports a depending rod 45 carrying a washer 46 at its lower end, and a compression spring 47 contacts at its lower end with the washer 46. The rod 45 extends through an opening 48 in the arm 38, and the upper end of the spring 47 contacts with the lower face of the arm 38 to normally hold it in the operative position shown in Figure 3. The weight of a package or article on the carrier bearing against the upwardly extending finger 43 depresses the inner end of the arm 38 against the tension of the spring 47 to swing the roller 42 inwardly for a purpose to be described.

Figure 4:
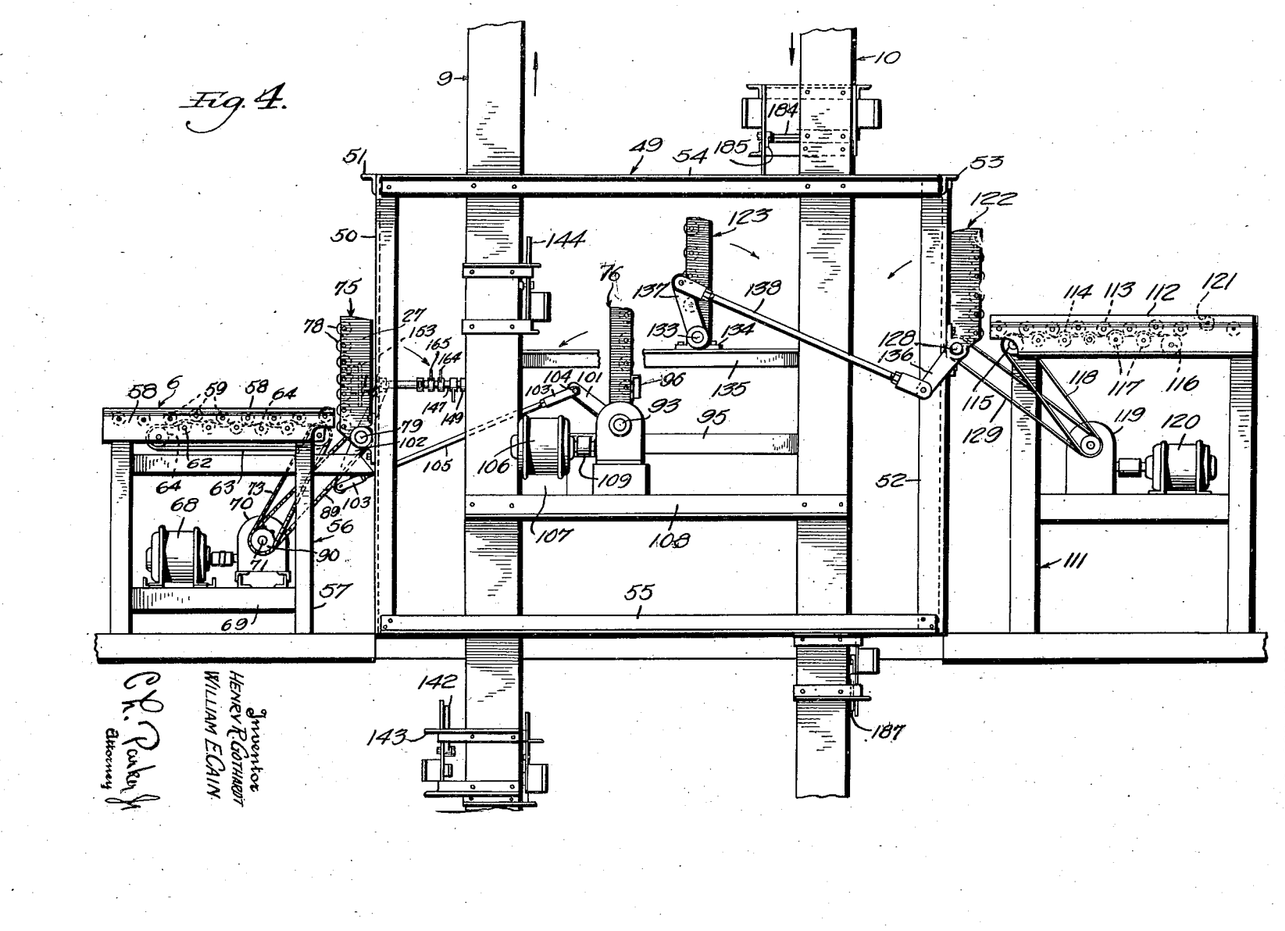
Figure 4 is a side elevation of the apparatus at one of the floors of the building showing the loading and discharge stations associated therewith.

A supporting framework indicated as a whole by the numeral 49 surrounds the guides 9 and 10 at each floor of the building. Referring to Figures 4 and 5, it will be noted that the framework 49 includes a pair of vertical angle iron posts 50 adjacent the ascending side of the apparatus and connected at their upper ends by a transverse rail 51. A similar pair of vertical rails 52 is arranged adjacent the descending side of the apparatus and is connected by an upper horizontal rail 53. The upper ends of the posts 50 and 52 and rails 51 are anchored in position by horizontal rails 54, secured to the guides 9 and 10, and the lower ends of the posts 50 are similarly connected by lower horizontal rails 55.

Each loading station includes a loading table indicated as a whole by the numeral 56. This table includes vertical corner posts 57 to the upper ends of which are connected parallel rails 58, and between these rails is arranged a plurality of load supporting rollers 59. Two of the load supporting rollers such as the rollers 60 and 61 are floating rollers normally arranged above the path of travel of articles and adapted to be depressed by the articles to close circuit controlling switches in a manner and for a purpose to be described.

Below the load supporting rollers is arranged a plurality of tensioning rollers 62 over which passes the upper run of a belt 63, and the ends of this belt pass around pulleys 64 and 65 mounted upon shafts 66 and 67 journalled in the side rails 58. The belt 63 is adapted to be driven by suitable means such as a motor 68 mounted upon a shelf 69 supported by the table 56 near the bottom thereof. The shaft of the motor is connected to a suitable reduction gear mechanism indicated as a whole by the numeral 70 for driving a shaft 71. A sprocket 72 is carried by the shaft 71 and drives a chain 73 passing around a sprocket 74 carried by the shaft 67 (see Figure 5).

Figures 8, 9:
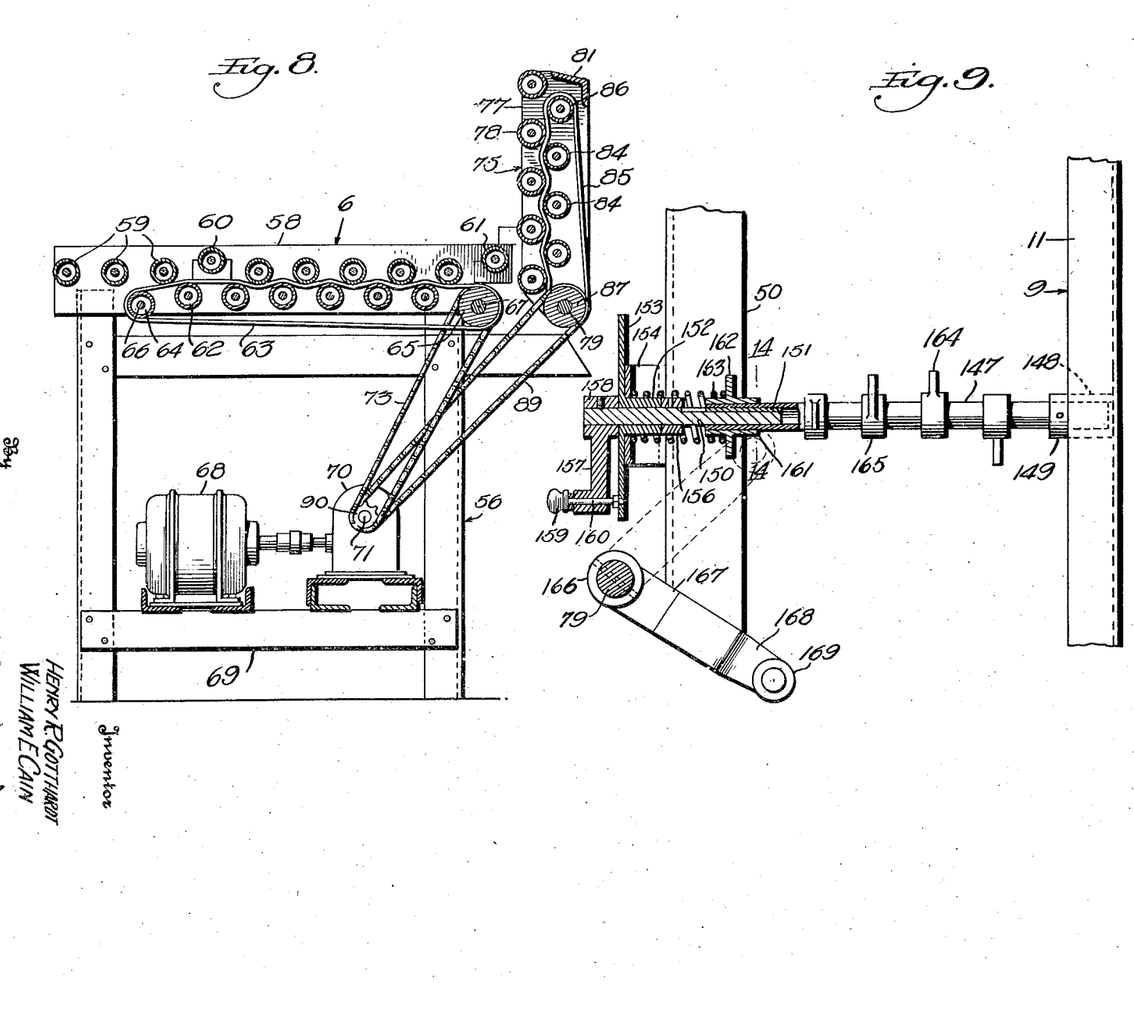
Figure 8 is an enlarged sectional view on line 8—8 of Figure 5 showing the loading gate in inoperative position.
Figure 9 is a sectional view taken axially through the dial setting mechanism showing elements associated therewith, parts being shown in elevation.

Each unloading station includes loading gates indicated as a whole by the numerals 75 and 76. The gate 75 includes side rails 77 between which are journalled load supporting rollers 78, and the rails 77 are supported at one end by a shaft 79 journalled in bearings 80 carried by the posts 50. The free ends of the rails 75 are connected by a transverse member 81, as shown in Figure 8. The loading gate normally occupies the vertical position shown in Figure 8 and is movable to a horizontal position under conditions to be described to permit an article or package to move to operative position on the two loading gates. A transverse member 82 is carried by the gate 75 and supports inclined guides 83 at its ends to guide the package for movement from the rollers 59 to the rollers 78.

A series of tensioning rollers 84 is arranged parallel to the series of rollers 78 as shown in Figure 8, and one run of a belt 85 passes between the two series of rollers. One end of the belt passes around a pulley 86 adjacent the free end of the gate 75, while the other end of the belt 85 passes around a pulley 87 freely rotatable on the shaft 79. The pulley 87 carries a sprocket 88 (see Figure 5) about which passes a chain 89, and the other end of this chain passes around a sprocket 90 carried by the shaft 71, as shown in Figure 8. It will be apparent that operation of the motor 68 is adapted to simultaneously operate the load supporting rollers 59 and 78.

The loading station gate 76 comprises side rails 91 between which are journalled freely rotatable rollers 92. This gate is supported by a shaft 93 journalled in bearings 94 carried by supports 95 arranged between the guides 9 and 10. A transverse bumper 96 extends across the gate 76 adjacent the shaft 93 and has its ends turned inwardly as at 97. Bumper springs 98 are carried by the bumper 96 to cushion the articles or packages coming into engagement with the bumper when the packages are moved to position on the gates by operation of the rollers 59 and 78. Downward swinging movement of the gates 75 and 76 is limited by an arm 99 connected at one end to the shaft 93 and having a projection 100 at its opposite end adapted to engage the rail 95.

Means are provided for effecting simultaneous movement of the gates 75 and 76. Referring to Figures 5 and 7, the numeral 101 designates an arm carried by the shaft 93 and projecting upwardly and inwardly at an angle. A similar arm 102 is carried by the shaft 79 and projects downwardly and outwardly therefrom. Yokes 103 are pivotally connected as at 104 to the free ends of the arms 101 and 102 and these yokes are connected to the ends of a rod 105. Obviously, swinging movement of the shaft 93 in the direction of the arrow in Figure 7 is adapted to transmit swinging movement to the shaft 79 and arm 102 in the opposite direction, as indicated by the arrow. This movement effects upward movement of the gates to inoperative position while reverse movement of the shaft 93 moves the gates to horizontal or operative position.

Power means is employed for swinging the gates 75 and 76 through their shafts 79 and 93. Referring to Figures 4 and 5, the numeral 106 designates a motor connected by a bracket plate 107 to the rail 95 and to a similar lower rail 108. The shaft of the motor is provided with a normally operative solenoid operated brake 109 which is automatic in operation. In other words, the brake is normally applied and has its solenoid arranged in the circuit of the motor whereby energization of the motor releases the brake to permit the motor to operate. The motor transmits power to a suitable speed reducing gearing indicated as a whole by the numeral 110, and the take off of this gearing is connected to the shaft 93, as shown in Figure 5.

Each unloading station is generally similar in structure to the loading stations. As shown in Figures 4 and 5, each unloading station includes a table indicated as a whole by the numeral 111 and having rails 112 at the top thereof between which are journalled load supporting rollers 113. Means are provided for positively driving the rollers 113 and since such means is substantially identical with the means employed for driving the rollers 68 of the loading station, it need not be described in detail. The upper run of a belt 114 passes around pulleys 115 and 116, and idler rollers 117 maintain the upper run of the belt in engagement with the bottoms of the rollers 113. The pulley 115 is driven by a belt 118 which in turn is driven from the take off shaft of a speed reducing gearing 119. Power is supplied to the speed reducing gearing by a motor 120, similar to the motor 68 previously described. One of the rollers 113, such as the roller 121, is a floating roller arranged slightly above the plane of the remaining rollers 113 to operate a switch for a purpose to be described.

Each unloading station further includes gates indicated as a whole by the numerals 122 and 123. The gate 122 includes side rails 124 between which are journalled rollers 125 to support articles or packages deposited thereon when the unloading gates are in operative position. The rollers 125 are positively driven under conditions to be described by a belt 126 which is similar in structure and function to the belt 85 previously described and illustrated in detail in Figure 8. This belt passes around pulleys 127 at its ends, and one of the pulleys is journalled on a shaft 128 which forms the supporting means for the gate 122. The latter pulley 127 is driven by a chain 129, and this chain, in turn, is driven from the speed reducing gearing 119. The shaft 128 is journalled in bearings 130 carried by the posts 52, as shown in Figure 5.

The gate 123 comprises side rails 131 between which are journalled load supporting rollers 132. A shaft 133 supports the gate 123 and is journalled in bearings 134 carried by a rail 135 connected between the guides 9 and 10. The shafts 128 and 133 are provided with arms 136 and 137 between which is connected a rod structure 138 similar to the corresponding means shown in Figure 7. The rod 138 is adapted to effect simultaneous operation of the gates 122 and 123.

Means similar to the motor 106 and associated elements are employed for driving the shaft 133. Such means includes a motor 139, a solenoid operated brake 140 for the motor shaft and a speed reducing gear 141 for transmitting power from the motor shaft to the shaft 133.

When there is an article on an unloading station, the corresponding gates are adapted to be lowered and the article moved to operative position thereon in a manner to be described, whereupon the article is in a position to be picked up by an ascending carrier to be deposited on a selected discharge station on the descending side of the conveyor. It is essential however, that movement of the gates to operative position and the placing of the article thereon be prevented if the next ascending carrier is already loaded. Means are provided for effecting movement of the gates to operative position upon the approach of a carrier, and this means is in the form of a switch 142 arranged below each loading station and connected by any suitable supporting means 143 to one of the guides 9. Such switch is arranged in the path of travel of the roller 42 (see Figure 3) to be actuated thereby and cause operation of the motor 106 of the corresponding loading station, together with movement of the loading gates to operative position, and these operations take place in a manner to be described. It will be apparent, however, that if there is a package on the next ascending carrier, such package will depress the finger 43 of the carrier and thus swing the free end of the arm 38 inwardly to move the roller inwardly of the switch finger 142 and accordingly the latter will not be operated.

Figure 10:
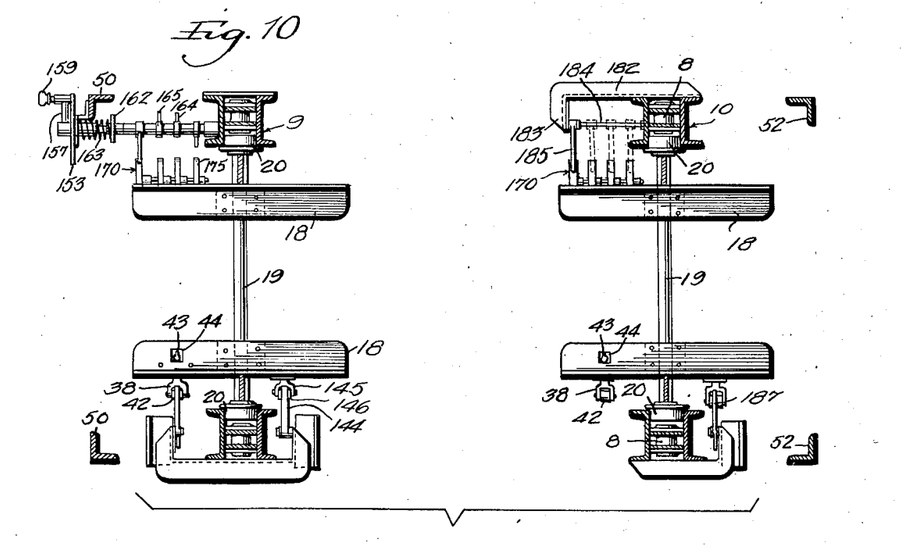
Figure 10 is a horizontal sectional view through the apparatus showing elevator carriers on the ascending and descending sides of the apparatus and associated parts.

It will be apparent that after an article has been picked up from a loading station, it is desirable to move the loading station gates back to normal or vertical position, and this operation is accomplished automatically by an ascending carrier after it has picked up an article from the loading station. Referring to Figures 4 and 10, the numeral 144 designates a switch carried by one of the guides 9 and projecting inwardly therefrom. A small yoked arm 145 projects outwardly from one of the rails 18 of each carrier and is provided with a roller 146 adapted to engage and operate each switch 144 during the upward movement of the carrier. If, upon operation of one of the switches 144, the corresponding loading gates are in operative position, proper circuits will be closed to cause the motor 106 to move the gates back to normal or vertical position.

The apparatus is provided with means on each loading station whereby the destination of an article placed on the loading station may be determined. Referring to Figures 4, 9 and 10, and particularly to Figure 9, the numeral 147 designates a tubular shaft supported at one end in a bearing 148 carried by one of the guides 9. A collar 149 is secured to the sleeve 147 to limit its sliding movement in the direction of the bearing 148. The inner end of a shaft 150 is slidable in the other end of the shaft 147 and is splined thereto as at 151. The shaft 150 has its outer end rotatably supported in a bearing 152 to which is connected a dial disk 153, and this disk and the bearing 152 are supported with respect to the adjacent post 50 by a bracket 154. The dial 153 is shown in elevation in Figure 11, and is provided with openings 155 corresponding to and numbered in accordance with the several floors of the building.

A collar 156 surrounds the shaft 150 in engagement with the inner end of the bearing 152 to prevent outward sliding movement of the shaft 150. A handle 157 is provided with a hub 158 secured to the shaft 150 outwardly of the disk 153 and contacting therewith to prevent sliding movement of the shaft 150 in the other direction. The free end of the handle 157 carries a small operating knob 159 to which is connected a slidable pin 160 having its inner end adapted for selective insertion in the openings 155 for determining the destination of an article in a manner to be described.

A sleeve 161 surrounds and is secured to the outer end of the shaft 147 and is provided with an outstanding disk flange 162. A compression spring 163 is arranged between the flange 162 and the portion of the bracket 154 which surrounds the bearing 152, and accordingly the sleeve 161 is normally urged toward the bearing 148. A plurality of setting fingers 164 is carried by the shaft 147. Each finger is provided with a hub 165 surrounding and secured to the shaft 147 and the various fingers are set in different circumferential positions corresponding with the positions of the dial openings 155.

As will be apparent, the operator may pull outwardly on the knob 159 at any time and rotate the handle 157 to set the dial mechanism in a selected position and then push the handle 159 inwardly to engage the inner end of the pin 160 in the selected opening 155. Accordingly the dial mechanism may be set under any conditions, but it is desired that it be rendered inoperative except when the gates of the corresponding loading station are in operative position to permit a package to be picked up therefrom. Accordingly, the shaft 79 is provided with a hub 166 from which projects an arm 167, and this arm is offset at its free end as at 168 to arrange it in a plane to one side of the flange 162. The free end of the arm 167 carries a roller 169 which is engageable against the flange 162. When the loading station gates are in horizontal or operative position the arm 167 is arranged in the position shown in Figure 9, but when the gates are elevated to vertical position, the shaft 79 holds the arm 167 in its upper position, whereupon the roller 169 engages the disk 162 as suggested in Figure 5, and thus the shaft 147 will be moved toward the left as viewed in Figure 9 for a purpose to be described.

Figure 12:
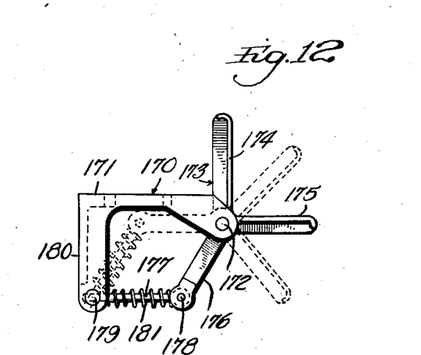
Figure 12 is a side elevation of one of the actuator mechanisms connected to each carrier and adapted to be set by the dial mechanism.

One of the fingers 164 is adapted to be arranged in operative position to determine the destination of an article picked up by the carrier, and the finger which is selected will project inwardly horizontally from the shaft 147. The fingers 164 are operative in conjunction with actuator devices each of which is indicated as a whole by the numeral 170. Each of these devices is arranged in the vertical plane of one of the fingers 164, and since the actuator devices are identical in construction, only one need be referred to in detail. Referring to Figure 12, the numeral 171 designates a bracket secured beneath one of the carrier rails 18 and at its outer end, the bracket carries a shaft or pin 172 pivotally supporting an actuator member 173. This member is preferably formed integral and includes a normally vertical arm 174, a normally horizontal arm 175, and a third arm 176 which normally projects downwardly and inwardly. A rod 177 is pivotally connected at its outer end to the free end of the arm 176, as at 178, while the inner end of the rod 177 projects through a pin 179 pivoted in the lower end of a depending arm 180 carried by the bracket 171.

A spring 181 surrounds the rod 177 between the bracket arm 180 and the arm 176, and with the actuator member 173 in the normal position shown in Figure 12, the spring 181 tends to revolve this member in a counter clockwise direction. It will be noted that the end of the bracket 171 adjacent the pivot 172 is in the form of a yoke forming a slot between its arms, and the arm 174 normally bears against the inner end of the slot to limit the turning movement of the member 173. The arm 175 is adapted to be moved in a counter-clockwise direction upon engagement with one of the fingers 164, and when the axis of the spring passes a line between the axes of the pivots 172 and 179, the spring snaps the member 173 to the dotted line position shown in Figure 12. Turning movement of the member 173 in a clockwise direction is then prevented by engagement between the free end of the arm 176 and the lower face of the bracket 171. It will be noted (see Figure 13) that the fingers 174 and 175 are offset from each other, and it will be apparent that the finger 175 on each actuator device is arranged in the vertical plane of one of the fingers 164 to be actuated thereby.

Each discharge station is provided with means operative for energizing the motor 139 to lower the discharge station gates upon the approach of a carrier having the actuator device properly set for the discharge station. Referring to Figure 10, the numeral 182 designates a bracket having one end offset as at 183 and supporting one end of a shaft 184. The other end of this shaft is supported by the adjacent rail of the guide 10. The shaft 184 is adapted to support a switch arm 185, and adjacent each unloading station, the switch arm 185 is secured to the shaft 184 in the proper position to be actuated by the arm 174 of the actuator mechanism corresponding to such station. For example, the switch arm 185 will be arranged in the solid line position shown in Figure 10 for the fifth floor discharge station and in the successive dotted line positions for the fourth, third and second floors. At the first floor, the discharge gates are fixed in horizontal or operative position so that any packages which are not discharged at the upper floors will be discharged at the first floor. Accordingly no motor 139 and associated elements is employed at the first floor. For the same reason, it is unnecessary to provide an actuating device 170 to predetermine the destination of an article at the first floor and accordingly it is unnecessary to employ a dial finger 164 corresponding to the first floor.

As previously stated, the setting of one of the actuator devices 170 to predetermine the destination of an article on one of the carriers causes operation of the switch arm 185 at the selected floor. Any suitable means may be employed for resetting the actuator devices. For example, the switch arms 185 may partake of limited movement to close their switches as the actuator devices pass by, whereupon further downward movement of the actuator devices in contact with the switch arms 185 may swing the arms of the actuator devices back to normal position. If desired, a bar 186 may be supported in any suitable manner adjacent the first floor as indicated generally in Figure 1, and this bar may occupy the relative position shown in dotted lines in Figure 5. Under such conditions, the bar 186 would be arranged in the path of travel of all of the actuator arms 174 to swing these elements upwardly to clear the actuator devices whereby they will all be in position to be set by the dial mechanisms on the ascending side of the apparatus.

In a manner to be described, the operation of one of the switch arms 185 by an actuator device on one of the carriers effects operation of the motor 139 to lower the discharge gate of the selected station, and when the carrier passes such station, the article will be deposited thereon and will move from the gates to the rollers 113. The motor 139 is then ready to be reversed in operation to swing the discharge gates back to normal or vertical position, and such operation is accomplished by engagement of the roller 146 of the carrier with a switch arm 187 arranged below each discharge station except the discharge station at the first floor.

Figure 15:
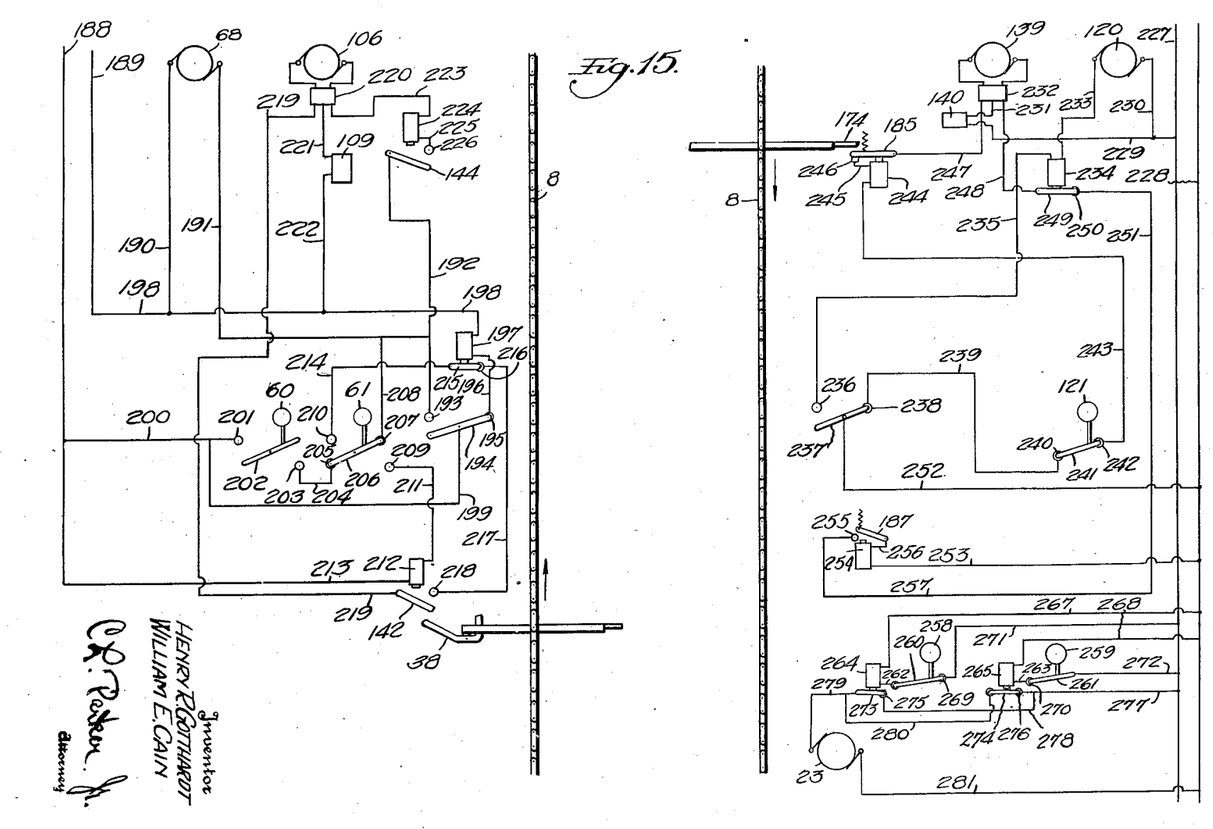

The electrical connections for one of the floors are shown in Figure 15, together with means for stopping the operation of the conveyor operating motor 23. In practice, certain control circuits are employed which are operated from the usual 110 volt direct or alternating current source, while the current for the power means is preferably supplied from a source of higher voltage connected to three phase motors. In the interest of simplicity, the entire system has been illustrated as being operated from the same source of current. Referring to Figure 15, the numerals 188 and 189 designate line wires connected to a suitable source of current, and the wire 189 is connected by a wire 190 to one terminal of the motor 68. The other terminal of this motor is connected by a wire 191 to a wire 192 which has its ends connected respectively to a contact 193 and to the switch arm 144, or to a switch operated by such arm. The contact 193 is adapted to be engaged by a switch indicated by the numeral 194, and this switch is any desired type of limit switch connected to one of the gates of the loading station. The switch 194 engages the contact 193 when the gates are lowered, and engages a contact 195 while the gates are in raised position. The contact 195 is connected by a wire 196 to one terminal of a magnet 197, and the other terminal of this magnet is connected to the line wire 189 by a wire 198. The limit switch arm 194 is connected to one end of a wire 199, and the other end of this wire is connected intermediate the ends of a wire 200. The latter wire is connected at one end to the line wire 188 and at its opposite end to a contact 201 adapted to be engaged by a switch arm 202. As diagrammatically illustrated in Figure 15, the switch arm 202 is adapted to be actuated upon depression of the float roller 60, and when so operated, the switch 202 engages the contact 201 and a second contact 203. A wire 204 is connected between the contact 203 and a contact 205 associated with a switch 206. The switch arm 206 normally engages the contact 205 and a second contact 207. A wire 208 is connected between contact 207 and the wire 191.

The switch arm 206 is connected to the float roll 61 to be operated upon depression thereof, under which conditions the switch 206 is moved into engagement with a pair of contacts 209 and 210. The contact 209 is connected to one end of a wire 211 and the other end of this wire leads to one terminal of a magnet 212. The other terminal of the magnet is connected by a wire 213 to the line wire 188. The contact 210 is connected by a wire 214 to an armature 215 associated with the magnet 197 and adapted to be attracted thereby when the magnet is energized. The armature 215 forms a switch arm movable into engagement with a contact 216 connected to one end of a wire 217. This wire leads to a contact 218 adapted to be engaged by the switch arm 142, or by a switch operated thereby. It will be noted that the switch arm 142 forms the armature of the magnet 212 and is connected to one end of a wire 219.

A reversing switch indicated as a whole by the numeral 220 is adapted to control the direction of rotation of the armature of the motor 106, and the wire 219 is connected to this reversing switch. The middle terminal of the reversing switch is connected by a wire 221 to one end of the winding of the solenoid of the brake 109 associated with the motor 106. The other terminal of the brake solenoid is connected by a wire 222 to the wire 198. The remaining terminal of the reversing switch 220 is connected by a wire 223 to one terminal of a magnet 224, and the other terminal of this magnet is connected by a wire 225 to a contact 226. The switch arm 144 forms the armature of the magnet 224.

Typical unloading station control circuits also have been illustrated in Figure 15. As shown, line wires 227 and 228 are employed, and these wires are connected to the same source as the line wires 188 and 189. The line wire 227 is connected to one end of a wire 229, and a branch 230 from this wire is connected to one terminal of the motor 120. The wire 229 also leads to one terminal of the solenoid of the brake 140 associated with the motor 139. The other terminal of the brake solenoid is connected by a wire 231 to the middle terminal of a reversing switch 232 operative for controlling the direction of rotation of the armature of the motor 139.

The second terminal of the motor 120 is connected by a wire 233 to one terminal of a magnet 234, and the other terminal of this magnet is connected to one end of a wire 235 leading to a contact 236. The numeral 237 designates a limit switch controlled by the discharge or unloading gates, and this switch is normally in engagement with a contact 238 when the unloading gates are in inoperative or vertical position. When the gates reach operative or lower position, the switch 237 is moved into engagement with the contact 236. The contact 238 is connected to one end of a wire 239 leading to a contact 240, and this contact is normally engaged by a switch arm 241 operatively connected to the floating roll 121. The switch arm 241 also normally engages a contact 242, and it will be apparent that depression of the roller 121 opens the switch 241.

From the contact 242, a wire 243 leads to one terminal of a magnet 244, and the other terminal of this magnet is connected by a wire 245 to a switch arm 246. The arm 185 is diagrammatically illustrated in Figure 15 as constituting a switch arm movable into engagement with the contact 246, and it is further illustrated as forming the armature of the magnet 244. From the switch 185, a wire 247 is connected to one of the terminals of the reversing switch 232, while the remaining terminal of this switch is connected by a wire 248 to a switch arm 249 forming the armature of the magnet 234 and movable into engagement with a contact 250. This contact is connected to one end of a wire 251.

The line wire 228 is connected by a wire 252 to the limit switch 237, and is also connected by a wire 253 to one terminal of a magnet 254. The arm 187 is illustrated as constituting the armature of the magnet 254 and as forming a switch arm movable into engagement with a contact 255. The second terminal of the magnet 254 is connected by a wire 256 to the switch 187 while the contact 255 is connected by a wire 257 to the wire 251.

Operation of one of the discharge gates to receive a dialed article is prevented if the unloading station is filled to capacity with packages or articles. This is accomplished by preventing the completion of a circuit to the motor 139 of any discharge station if the floating roller 121 thereof is held depressed. If desired, the circuit to the main elevator motor 23 may be broken to prevent further operation of the apparatus if any discharge station is over-loaded, and in practice, such operation is preferred. In Figure 15, circuit means for the elevator motor 23 is illustrated, and such control means may be located, for example, at the first floor of the building to break the circuit to the motor 23 if the discharge station at the first floor is overcrowded. Similar means may be employed at any discharge station, or at all of them, if desired.

Referring to the lower right hand portion of Figure 15, the numerals 258 and 259 designate floating rolls in the discharge line leading from the first floor station, and these rolls may be of the same type as the floating rolls previously described. These floating rolls respectively control switches 260 and 261 connected respectively by wires 262 and 263 to magnets 264 and 265. The other terminals of the magnets are connected respectively by wires 267 and 268 to the line wire 228. The switch arms 260 and 261 normally engage contacts 269 and 270, and wires 271 and 272 lead from these contacts to the line wire 227.

The magnets 264 and 265 are respectively provided with armatures 273 and 274 which form switches normally in engagement with contacts 275 and 276. The latter contact is connected by a wire 277 to the line wire 227, while the contact 275 is connected by a wire 278 to the wire 277. The switch arm 273 is connected by a wire 279 to one terminal of the elevator motor 23, while the switch arm 274 is connected to the wire 279 by a wire 280. The other terminal of the elevator motor is connected by a wire 281 to the line wire 228.

Figure 11:
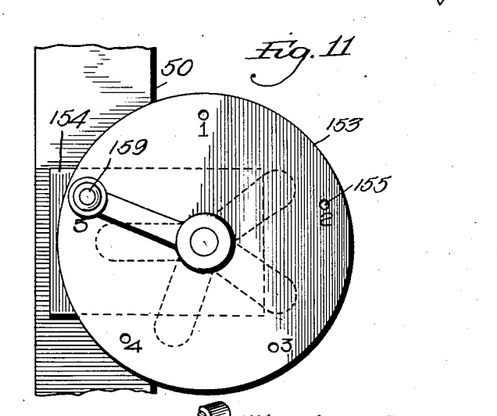
Figure 11 is a face view of the dial and associated parts.

The operation of the apparatus is as follows:

Each of the loading stations operates in the same manner, while each unloading station except the one at the first floor operates in the same manner, and accordingly all need not be described in detail. When it is desired to convey an article from one floor to another in the building, the operator sets the dial mechanism for the desired floor of discharge and then places the article on the loading table or platform. Referring to Figures 9, 10, and 11, the operator pulls outwardly on the knob 159 to release the pin 160 from the opening 155 in which it is arranged, and thereupon turns the knob to the desired position and then pushes inwardly upon the knob to insert the pin 160 in the selected dial opening 155. This action revolves the dial shaft 150, which in turn revolves the shaft 147 to place the selected operating finger 164 in its proper operative position. It will be apparent that when this operation is performed, the corresponding loading station gates will be in vertical or inoperative position, in which case the arm 167 (see Figure 9) will be in its upper position with the roller 169 bearing against the flange 162. Under such conditions, the shaft 147 and dial fingers 164 will be held toward the left of the positions illustrated in Figure 9, and all of the fingers 164 will be arranged out of the vertical plane of the actuator fingers 175 (see Figure 12). In other words, under the conditions referred to, all of the dial fingers will be moved from the positions illustrated in Figure 10 to positions wherein the actuator devices are free to move vertically past the dial fingers without being affected thereby regardless of the dial setting.

After the dial has been set in the manner stated, the operator places the package upon the outer end of the loading table whereby it will be supported by the rollers 59 and will depress the floating roller 60, thus causing the switch arm 202 to assume operative position in engagement with the contacts 201 and 203. Under such conditions, current flows from line wire 188 through wire 200, across contacts 201 and 203, through wire 204 to contact 205. Since the article under such conditions will not depress the roller 61, the switch 206 associated therewith will be in the normal position shown in Figure 15, and current thus will flow across the contacts 205 and 207, through wires 208 and 191, through motor 68, and thence back to the source through wires 190, 198 and 189.

The motor 68 thus will be energized and operates through the chains 73 and 89 (see Figure 8) to transmit a positive rotating action to the rollers 59 and 78. In this connection it will be noted that the two sets of rollers referred to are always either inoperative or simultaneously rotated. When the circuit to the motor 68 is completed in the manner described, movement of the article on the platform or table will be effected whereby the article travels toward the upturned adjacent loading gate 75. It will be noted that the roller 61 is arranged adjacent the gate 75, and when the article depresses this roller, the switch 206 will be moved out of engagement with the contacts 205 and 207 to break the circuit through the motor 68. The gate section 75 obviously acts as a stop to prevent overrunning of the article and the latter will be retained in position adjacent the gate and will hold the roller 61 in depressed position. With the roller held in such position, the switch arm 206 will be retained in engagement with the contacts 209 and 210 pending further operation to be described.

With the operation completed through the steps described, the dial mechanism will be set to predetermine the destination of the article and the latter will be arranged in a position ready to be transferred to loading position. Further operation of the apparatus then depends upon the arrival of one of the unloaded carriers. If a carrier approaches with a package or article in place thereon, the weight of the article will hold the finger 43 in depressed position, whereby the free end of the arm 38 will be held in its inner inoperative position and will pass the arm 142 without transmitting movement thereto. Since the operation of the loading gates is dependent upon actuation of the arm 142, it will be apparent that the loaded carrier will continue in its vertical movement without affecting any of the apparatus at the loading station.

Assuming that an unloaded carrier approaches from below, the arm 38 will be arranged in operative position, and the roller 42 will contact with the arm 142 to move the latter, or a switch arm connected thereto, into engagement with the contact 218. As previously stated, the arm 142 is diagrammatically illustrated in Figure 15 as forming the switch arm movable into engagement with the contact 218 and as constituting the armature for the magnet 212. Upon engagement between the arm 142 and contact 218 a circuit will be completed to effect movement of the loading gates to horizontal or operative position, and when the gates reach such position, the live rollers 59 and 78 will effect movement of the article to operative position ready to be picked up by the carrier.

Referring to Figure 15, it will be noted that the switch arm 194 is in engagement with the contact 195 when the loading gates are in vertical position, and accordingly current under such conditions normally flows from line wire 188, through wires 200 and 199, through switch 194, contact 195, wire 196 and magnet 197, and thence back to the source through wires 198 and 189. Thus the circuit described is normally closed and the arm 215 is retained in engagement with its contact 216.

Upon the closing of the switch 142 by an ascending empty carrier, current flows from line wire 188 through wire 213, magnet 212 and wire 211. Since the article at the loading station is holding the roller 61 depressed at such time, the current will flow between contacts 209 and 210 through the switch arm 206, thence through wire 214, switch 215, contact 216, wire 217 to the contact 218. The circuit then continues through switch 142, wire 219, thence through reversing switch 220, wire 221 and through the solenoid switch 109, and thence back to the source through wires 222, 198 and 189. It will be apparent that the closing of the switch 142 need be only momentary since the completion of the circuit referred to includes the magnet 212 in series, and accordingly the switch 142 will be retained in closed position after it is released by continued upward movement of the carrier.

Under the conditions described, the motor 106 will be energized and will be caused to rotate in one direction to transmit closing or lowering movement to the gate 76, and this movement will be transmitted to the gate 75, in the manner described, by the rod 105 (see Figures 5 and 7). The circuit described obviously will remain closed through the continued energization of the magnets 197 and 212, and when the gates reach their horizontal or operative position, the switch 194 will be snapped out of engagement with the contact 195 and into engagement with the contact 193. Since the magnet 1~~ is arranged in series with the contact 195, the movement of the limit switch obviously breaks the circuit through the magnet 197 to drop its armature 215 and thus break the previously described circuit through the motor 106.

As previously stated, the solenoid brake 109 is of the conventional type which is normally operative and which is rendered inoperative upon completion of the circuit to its associated motor. Thus when the circuit to the motor 106 is broken in the manner described, the motor will be rendered immediately inoperative by the application of the brake 109. This action takes place when the loading gates reach horizontal position, and further movement of the gates may be positively prevented by the use of the limiting arm 99 shown in Figure 5.

Simultaneously with the breaking of the motor circuit by movement of the limit switch out of engagement with the contact 195, a circuit will again be completed through the roller operating motor 68 upon engagement between the limit switch 194 and the contact 193. Current flows from line wire 188 through wires 200 and 199, through switch 194 and contact 193, through the wire 191 and the motor 68, and thence back to the source through wires 190, 198 and 189. Thus it will be apparent that as soon as the loading gates reach horizontal position, the motor 68 will promptly start its operation to transmit rotating movement to the live rollers 59 and 78, whereupon the article or package at the loading station proceeds to move to operative position on the loading gates. Referring to Figure 5, it will be noted that the article moves directly from the loading table to the gates and will be guided in its movement by the members 83. Positive movement will be transmitted to the article by the live rollers 78 of the gate 75, and these rollers will effect movement of the entering end of the article to the gate 76 until the article contacts with the spring bumpers 98, whereupon further movement of the article will be arrested.

At approximately the same time, the carrier will have arrived at the proper position to pick up the article from the loading station. In this connection it will be noted that the shaft or rod 19 of the carrier passes between the spaced ends of the gates 75 and 76, while the rails 18 of the carrier lie outwardly of the sides of the gates as shown at the right hand side of Figure 5. As the carrier moves past the loading gates it obviously picks up the article from the gates, whereupon the article is ready to be conveyed to and discharged at the proper discharge station.

Figure 13:
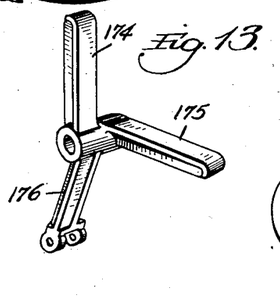
Figure 13 is a detail perspective view of the actuator finger element shown in Figure 12.
Figure 14:
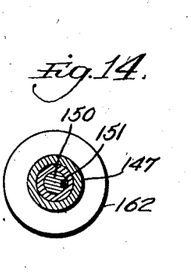
Figure 14 is a detail section on line 14—14 of Figure 9, and, Figure 15 is a wiring diagram showing the electrical connections for one of the floors of the building.

As the empty carrier moves past the loading station, the actuator devices 170 pass the dial fingers, and it will be apparent that when the gates 75 and 76 were lowered, the disk 162 was released by the roller 169 to permit the shaft 147 to return to normal position with each of the fingers 164 arranged in the vertical plane of one of the arms 175. Accordingly it will be apparent that the finger 164 which has been placed in operative position in accordance with the dial setting will operate the corresponding arm 175 to swing one of the actuator devices to operative position. Inasmuch as these devices are moving upwardly with the carriers, the movement transmitted to the arm 175 will be relatively downwardly, and the arm 175 is moved in a clockwise direction in the manner previously stated, and when the axis of the spring 181 passes the plane of the axes of the pivots 172 and 179, the actuator device will snap to the operative position shown in dotted lines in Figure 12. As previously stated, and as shown in Figure 13, the arms 174 and 175 of each actuator device are arranged in different vertical planes, the arms 175 of the various actuator devices being arranged in the vertical planes of the fingers 164, while the fingers 174 are arranged in the vertical plane of the arms 185 of the discharge stations.

Upon completion of the operation through the steps described, it will be apparent that the loading station will have been relieved of the article and will be ready to be moved back to inoperative position, while one of the actuator devices will have been set to determine the destination of the article. Upon continued ascending movement of the carrier, the roller 146 carried thereby (see Figure 10) will engage the arm 144, and thus move it into engagement with the contact 226, and this action closes the reverse circuit of the motor 106 and swings the loading gates back to normal or vertical position.

Referring to Figure 15, it will be recalled that when the loading gates reached lower position they transmitted movement to the limit switch 194 to move it into engagement with the contact 193, and upon the closing of the switch 144 by the roller 146, current will flow from the line wire 188 through wires 200 and 199, through switch 194 and contact 193, through wire 192 to the switch arm 144. From this switch arm the circuit is completed through contact 226, wire 225, solenoid 224, wire 223 and reverse switch 220, and thence back to the source through wire 221, the solenoid of the brake 109, and wires 222, 198 and 189. Inasmuch as the magnet 224 is arranged in series with the circuit just described, it will be necessary for the switch 144 to be closed only momentarily, and the circuit will remain closed until the gates reach inoperative position, whereupon the limit switch will again be moved to normal position in engagement with the contact 195.

Under such conditions, the reverse circuit through the motor 106 will be broken at the contact 193, thus deenergizing the magnet 224 and dropping the armature 144 which remains inoperative pending further actuation by a carrier, provided the loading gates are in operative position. In other words, the reverse motor circuit cannot be completed unless the circuit through the contact 193 is completed, which cannot take place unless the loading gates are down. The circuit through the magnet 197 is restored upon movement of the limit switch back to normal position in engagement with contact 195, and thus the switch 216 will be moved into engagement with the contact 216 and will be held in such position pending subsequent operation.

As the gate 75 reaches its upper or normal position, the roller 169 (see Figure 9) will again engage the disk 162 to move the fingers 164 out of the vertical planes of the arms 175 of the actuator devices. Thus it will be apparent that all of the parts of the loading station will be automatically returned to normal condition.

The loaded carrier continues its movement to the top of the building, and then swings over into the descending side of the apparatus and starts its downward movement. When the carrier approaches the selected discharge position, the arm 174 of the selected actuator device will move the arm 185 into engagement with the contact 246, shown in Figure 15. Inasmuch as the selected arm 174 is out of the vertical plane of all but one of the arms 185, it obviously must close the proper switch 185.

When the switch 185 is moved into engagement with the contact 245, a circuit will be completed from line wire 227 through wire 229, through the solenoid of brake 140 and wire 231, thence through the reversing switch 232, through the wire 247 and switch arm 185. This switch arm normally is held upwardly by suitable means such as a small spring, and accordingly the circuit is normally open at the contact 246. Upon the completion of the circuit at this point, however, current flows through wire 245 and magnet 244, wire 243, contact 242, switch 241, and contact 240. The circuit at this point is normally closed inasmuch as no articles are resting upon the floating roll 121, and accordingly current will continue to flow through wire 239 to contact 238, and thence back to the source through limit switch 237 and wires 252 and 228. The limit switch is normally in engagement with the contact 238 when the unloading gates are in vertical or inoperative position as will be apparent. When the circuit described is closed, the motor 139 will be operated in one direction in the same manner as the motor 106 previously described, and accordingly the unloading gates 122 and 123 will start to move downwardly to horizontal or operative position.

The operation referred to takes place, as stated, provided the floating roller 121 is not depressed. If the loading station previously selected is filled to capacity, an article resting on the floating roller 121 will hold the circuit open across the contacts 240 and 242, and the circuit through the motor 139 cannot be completed and the unloading gates cannot be moved to unloading position. Under such circumstances the loaded carrier will continue its downward movement without discharging the article until it reaches the first floor of the building, whereupon the article will be discharged upon the normally operative discharge station at such floor. The live roller driving motor at this discharge station will be continuously operating to carry off articles deposited by a carrier.

Assuming however that the switch 241 is closed as is normally the case, the motor 139 will be operated to lower the discharge gates in the manner previously described. Inasmuch as the magnet 244 is in series with the motor circuit described, this circuit will remain closed after the switch 246 is released by the downwardly moving carrier. Accordingly the motor circuit will remain closed until the unloading gates reach operative position, whereupon the circuit will be broken by movement of the limit switch 237 out of engagement with the contact 238, at which time the operation of the motor will stop and the brake 140 will be applied to the shaft of the motor.

As soon as the unloading gates reach lower position the switch 237 will be moved into engagement with the contact 236, as previously stated, under which conditions current will flow from line wire 227 through wire 230, motor 120, wire 233, magnet 234 and wire 235, to the contact 236. The current then returns to the source through switch 237, wire 252 and line wire 228. Since the motor 120 is connected to the live rollers 113 and 125, these rollers will operate as long as the unloading gates remain in lower position and the switch 237 is in engagement with the contact 236. The circuit through the magnet 234 also will be completed under such conditions and will hold the armature 249 in engagement with the contact 250. Thus the gates will be closed and the live rollers will be operating when the loaded carrier reaches the gates, and the carrier will deposit the article or package upon the unloading gates and continue its downward movement. The article will be moved by the live rollers from the unloading gates to the rollers 113 from which they will pass to a take-off conveyor of any suitable type connected to the unloading station. The article during such movement passes over the floating roller 121 to open the switch 241 but this action does not affect the system since the switch 241 is connected only in the circuit of the motor 139 which includes the switch 237, and the latter already will have been moved out of engagement with the contact 238 and into engagement with the contact 236 in the manner previously described.

The carrier after having deposited the article upon the unloading station continues its downward movement, whereupon the roller 145 operates the arm 187 to move this arm or a switch arm connected thereto into engagement with the contact 255. Under such conditions, current will flow from line wire 227 through wire 229 and the solenoid of brake 140, thence to the reversing switch 232 through wire 231, from the reversing switch through wire 248, switch 249, contact 250 and wire 251 to the contact 255. This contact will be engaged by the arm 187 in the manner previously described, and thus the current will continue back to the source through wire 256, magnet 254 and wire 253, and line wire 228.

Inasmuch as the magnet 254 is in series with the circuit just described, the switch 187 need be closed only momentarily, and will be held closed by the magnet 254 and the motor 139 will operate in the reverse direction to return the unloading gates to normal position. At such time, the circuit just described will be broken by movement of the limit switch out of engagement with the contact 236 and into engagement with the contact 238, whereupon the circuit will be completely restored to normal condition. In this connection, it will be noted that the switch 187 is normally urged away from the contact 255 by a suitable spring or similar device. Upon the return of the limit switch to normal position, the circuit through the magnet 234 will be broken and the armature 249 will be dropped. Likewise the circuit through the motor 120 will be broken and the live rollers of the discharge station will cease to operate.

As previously stated, all of the unloading stations are identical except the station at the first floor, at which station the unloading gates are fixed in operative position. Thus it is unnecessary to provide dial setting means to discharge articles at the first floor inasmuch as articles not discharged at any other station will be discharged upon the fixed gates at the first floor when a loaded carrier reaches such position. Accordingly, when the dial knob 159 is set for the first floor, none of the operating fingers 164 will affect the actuator devices 170, and accordingly the predetermined destination of an article under such conditions will be the first floor.

As a safety measure, the floating rollers 121 may be employed at each discharge station above the first floor whereby it will be impossible to discharge a package at any station which is filled to capacity, regardless of the fact that the actuator device of a loaded carrier is set for such discharge station. Under such conditions, an article designated for an upper floor of the building will be carried to and discharged at the first floor, and thus injury will be prevented.

It is preferred that the first floor of the building be provided with means for stopping the operation of the elevating means when the unloading station at the first floor is crowded with articles, and if desired, such means may be employed at each floor of the building. Referring to Figure 15, it will be noted that the switch arms 260 and 261 are connected in parallel, and if either is in normal engagement with its associated contact, a circuit will be completed through the corresponding magnet 264 or 265. Likewise, the switches 273 and 274 are connected in parallel and the circuit to the elevator motor 23 will be completed if either magnet 264 or 265 is energized to attract its armature 273 or 274 to operative position. Current flows from line wire 227 through wire 277, through either switch 273 or 274 and its associated wiring, thence through the motor 23 and back to the source through wires 281 and 228.

Accordingly it will be apparent that an article discharged at the first floor of the building and moved therefrom by the live roller conveying means will pass successively over the rollers 258 and 259, thus successively opening the switches 260 and 261. The rollers 260 and 261, however, are spaced a sufficient distance apart to prevent their simultaneous operation by a single package, and the movement of a single package will effect the dropping of the armature switches 273 and 274 successively but not simultaneously, and accordingly the circuit for the motor 23 will remain unbroken. If the unloading station at the first floor becomes crowded however, and different packages or articles simultaneously depress both rollers 260 and 261, both magnets 264 and 265 will be deenergized to simultaneously drop the armature switches 273 and 274. Thus the circuit through the motor 23 will be broken and cannot be again completed until at least one of the articles depressing one of the rollers 258 or 259 is removed. It is preferred that the travel of the arms 273 and 274 be such that they will not be returned to normal position upon removal of the articles from the rollers 258 and 259 until they are manually reset by any suitable means. Thus the control means for the circuit of the motor 23 affords safety means to prevent damage to the apparatus. As previously stated, such means may be employed, if desired, in connection with the unloading station at all of the floors in the building, or at any selected discharge stations, depending upon the particular installation and the work which it is called upon to perform.

From the foregoing it will be apparent that all of the functions of the apparatus are fully automatic with the exception of the setting of the dial which is performed manually in accordance with the desired destination of an article. Of course, if a succession of articles are to be transferred from a given floor of the building to the same discharge station, the entire apparatus is fully automatic after the dial mechanism has been set for the first article. In other words, the mere setting of the dial at a given station is all that is necessary to determine the destination of an article placed upon a loading platform, and even the setting of the dial is unnecessary for successive articles to be transferred to the same destination. The apparatus is comparatively simple considering the automatic functions which it is intended to perform, and is entirely self-clearing. That is to say, when a given dial setting has been made, and an article placed in position on the loading station, the loading of the article on a carrier is dependent upon the arrival of an empty carrier, which picks up the article from the lower gates, whereupon the gates are automatically cleared to inoperative position as is the dial setting. The same is true at the descending side of the apparatus, since a descending loaded carrier selects its predetermined discharge station, accomplishes the lowering of the gates and discharges the article thereon, whereupon the article is automatically removed from the gates and the gates automatically clear themselves from the path of the carriers by returning to normal position.

It is to be understood that the form of our invention herewith shown and described is to be taken as a preferred example of the same and that various changes in the shape, size, and arrangement of parts may be resorted to without departing from the spirit of the invention or the scope of the subjoined claims.

We claim:

1. A conveyor comprising endless conveying means, a plurality of loading stations and a plurality of unloading stations, a carrier connected to said conveying means to be moved thereby past said stations, manually operable means at each loading station adapted to be set in accordance with the desired destination of an article to be conveyed from such station, means for supporting an article adjacent each loading station, a gate operable when in one position for preventing movement of an article from said supporting means into position to be picked up by said carrier, said gate being movable to a second position to permit movement of the articles into a position to be picked up by the carrier, means operable when the gate is in said first named position for preventing the functioning of said manually operable means, means connected to the carrier and operable in accordance with the setting of said manually operable means for determining the destination of the article, and means at the selected discharge station operable by said last named means for removing the article from the carrier when the latter reaches such discharge station.

2. Apparatus of the character described comprising endless conveying means, a plurality of loading stations and a plurality of unloading stations arranged adjacent said conveying means, a carrier connected to the conveying means and movable thereby past said loading and unloading stations, destination determining means connected to the carrier and selectively operable for determining the destination of an article on the carrier, setting mechanism at each loading station including a plurality of fingers adapted to be selectively set in operative positions to determine the operation of said destination determining means, each loading station including a receiving platform and a normally inoperative gate preventing movement of an article on the platform to a position to be picked up by the carrier, said gate being movable to an operative position to permit movement of the article to a position to be picked up by the carrier, and means operative when the gate is in normal position for rendering said setting mechanism ineffective for operating the station determining mechanism.

3. Apparatus constructed in accordance with claim 2 provided with power means operative for effecting movement of an article from said platform to a position to be picked up by said carrier, and means for automatically rendering said power means operative upon movement of said gate to its second position.

4. Apparatus of the character described comprising endless conveying means, a plurality of loading stations and a plurality of unloading stations arranged adjacent said conveying means, a carrier connected to the conveying means and movable thereby past said loading and unloading stations, destination determining means connected to the carrier and selectively operable for determining the destination of an article on the carrier, setting mechanism at each loading station including a plurality of fingers adapted to be selectively set in operative positions to determine the operation of said destination determining means, each loading station including a receiving platform and a normally inoperative gate preventing movement of an article on the platform to a position to be picked up by the carrier, said gate being movable to an operative position to permit movement of the article to a position to be picked up by the carrier, means operative when the gate is in normal position for rendering said setting mechanism ineffective for operating the station determining mechanism, means for moving said gate from its normal position to its second named position, and means for effecting operation of said last named means upon the approach of an empty carrier and provided there is an article to be conveyed on said platform.

5. Apparatus constructed in accordance with claim 4 provided with power means operative for effecting movement of an article from said platform to a position to be picked up by said carrier, and means for automatically rendering said power means operative upon movement of said gate to its second named position.

6. A conveyor comprising a loading station, a plurality of unloading stations, conveying means including a carrier movable successively past said loading station and said unloading stations, a rotatable shaft adjacent the loading station, a plurality of angularly spaced fingers carried by said shaft in predetermined planes at right angles thereto, station determining means connected to the conveying means and including a plurality of setting members respectively arranged in the predetermined planes of said fingers and to be selectively actuated thereby in accordance with their rotated positions, means at the selected discharge station operable by the selected setting member for removing an article from the carrier when the latter reaches the selected discharge station, and means for effecting axial movement of said shaft to inoperative position to move said fingers out of their predetermined planes and out of the path of travel of said setting members.

7. Apparatus constructed in accordance with claim 6 wherein said loading station includes a gate movable between an operative position in the path of said carrier and an inoperative position out of the path of said carrer, and means operative by said gate when in inoperative position for holding said shaft in inoperative position.

8. Apparatus constructed in accordance with claim 6 provided with resilient means urging said shaft axially toward operative position with said fingers arranged in their predetermined planes, a flange carried by said shaft, said loading station including a gate pivoted to swing between an operative position in the path of said carrier and an inoperative position out of the path of said carrier, and a roller movable with said gate and engageable with said flange to hold said shaft in inoperative position when said gate is in inoperative position.

In testimony whereof we affix our signatures.

HENRY R. GOTTHARDT.
WILLIAM E. CAIN.